US012786150B2

(12) United States Patent
Lancioni et al.

(10) Patent No.: US 12,786,150 B2
(45) Date of Patent: Nov. 3, 2026

(54) REPUTATION CLUSTERS FOR UNIFORM RESOURCE LOCATORS

(71) Applicant: McAfee, LLC, San Jose, CA (US)

(72) Inventors: German Lancioni, San Jose, CA (US); John Wagener, West Lakeland, MN (US)

(73) Assignee: McAfee, LLC, San Jose, CA (US)

( * ) Notice: Subject to any disclaimer, the term of this patent is extended or adjusted under 35 U.S.C. 154(b) by 693 days.

(21) Appl. No.: 17/130,194

(22) Filed: Dec. 22, 2020

(65) Prior Publication Data

US 2022/0200941 A1 Jun. 23, 2022

(51) Int. Cl.

*G06F 40/242* (2020.01)
*G06F 40/274* (2020.01)
*H04L 51/212* (2022.01)
*H04L 61/4511* (2022.01)

(52) U.S. Cl.

CPC .......... *H04L 51/212* (2022.05); *G06F 40/242* (2020.01); *G06F 40/274* (2020.01); *H04L 61/4511* (2022.05)

(58) Field of Classification Search

CPC ............. H04L 61/4511; H04L 61/3025; H04L 63/1483; H04L 63/1441; H04L 61/302; G06F 40/242; G06F 40/274; G06F 21/55

See application file for complete search history.

(56) References Cited

U.S. PATENT DOCUMENTS 5,907,680 A * 5/1999 Nielsen ............... G06F 16/9566 707/E17.115
7,549,169 B1 * 6/2009 Sobel .................. H04L 63/1441 713/168
7,698,442 B1 * 4/2010 Krishnamurthy ....... G06F 21/51 709/229
7,769,820 B1 * 8/2010 Spies ...................... H04L 63/08 709/219
8,079,087 B1 * 12/2011 Spies .................... G06F 16/954 709/225
8,285,830 B1 * 10/2012 Stout ................... H04L 63/1441 709/224
8,533,580 B1 * 9/2013 Xu ........................ G06F 16/957 715/208
8,769,683 B1 * 7/2014 Oliver ................... G06F 21/561 719/311

(Continued)

OTHER PUBLICATIONS

Wolfgarbe; SymSpell; Oct. 31, 2020; GitHub, Inc.; pp. 1-22. (Year: 2020).*

*Primary Examiner* — Muhammad Raza
(74) *Attorney, Agent, or Firm* — PATENT CAPITAL GROUP

(57) ABSTRACT

There is disclosed an example of one or more tangible, non-transitory computer-readable storage media, including instructions to: enumerate domain names newly registered in a time window; build a dictionary from the newly registered domain names; cluster the domain names, including performing a spell check with the dictionary to identify similar domain names; for a selected cluster, identify one or more domain names with an assigned reputation; and if a portion of assigned reputations exceeds a threshold of bad reputations, assign cluster-based bad reputations to domains in the cluster with unknown reputations.

19 Claims, 10 Drawing Sheets

(56) References Cited

U.S. PATENT DOCUMENTS

| | | | | |
|---|---|---|---|---|
| 8,909,558 | B1 * | 12/2014 | Nicks | G06Q 30/0273 707/769 |
| 8,966,625 | B1 * | 2/2015 | Zuk | H04L 63/168 709/227 |
| 8,990,933 | B1 * | 3/2015 | Magdalin | G06F 21/85 709/229 |
| 9,058,393 | B1 * | 6/2015 | Nicks | G06F 16/90344 |
| 9,185,119 | B1 * | 11/2015 | Tamersoy | H04L 63/14 |
| 9,264,399 | B1 * | 2/2016 | Schryver | H04L 63/101 |
| 9,378,373 | B2 * | 6/2016 | Sobel | G06F 21/577 |
| 9,516,058 | B2 * | 12/2016 | Antonakakis | H04L 61/4511 |
| 9,519,682 | B1 * | 12/2016 | Pujara | H04H 20/28 |
| 9,619,825 | B1 * | 4/2017 | Albert | H04L 41/0668 |
| 9,762,612 | B1 * | 9/2017 | Schiffman | H04L 41/0631 |
| 9,781,150 | B1 * | 10/2017 | Zhao | G06N 20/00 |
| 9,882,933 | B1 * | 1/2018 | Schiffman | H04L 63/1483 |
| 9,894,045 | B1 * | 2/2018 | Mao | G06F 21/554 |
| 9,953,105 | B1 * | 4/2018 | Gupta | H04L 67/02 |
| 10,255,435 | B1 * | 4/2019 | Kamble | H04L 63/145 |
| 10,462,180 | B1 * | 10/2019 | Ben David | H04L 63/0823 |
| 10,489,587 | B1 * | 11/2019 | Kennedy | G06N 5/045 |
| 10,496,924 | B1 * | 12/2019 | Highnam | H04L 63/0236 |
| 10,498,753 | B1 * | 12/2019 | Pope | G06F 16/9566 |
| 10,728,273 | B1 * | 7/2020 | Okubo | H04L 61/302 |
| 10,862,907 | B1 * | 12/2020 | Pon | G06F 16/955 |
| 10,911,477 | B1 * | 2/2021 | Kharraz | G06F 16/90344 |
| 10,936,813 | B1 * | 3/2021 | Gupta | G06F 40/263 |
| 11,012,414 | B2 * | 5/2021 | Moore | H04L 63/0245 |
| 11,868,380 | B1 * | 1/2024 | Pavlopoulou | G06F 16/3323 |
| 11,886,586 | B1 * | 1/2024 | Chang | G06F 21/566 |
| 2005/0022008 | A1 * | 1/2005 | Goodman | G06Q 10/107 726/4 |
| 2006/0036767 | A1 * | 2/2006 | Ryan | H04L 61/00 709/245 |
| 2006/0068755 | A1 * | 3/2006 | Shraim | H04M 15/47 455/410 |
| 2006/0069697 | A1 * | 3/2006 | Shraim | H04L 63/1441 707/999.102 |
| 2006/0112066 | A1 * | 5/2006 | Hamzy | H04L 61/30 |
| 2006/0112094 | A1 * | 5/2006 | Sullivan | G06F 16/9566 707/999.005 |
| 2007/0028301 | A1 * | 2/2007 | Shull | G06Q 40/02 726/22 |
| 2007/0107053 | A1 * | 5/2007 | Shraim | H04L 63/1483 726/22 |
| 2007/0156895 | A1 * | 7/2007 | Vuong | G06Q 10/00 709/225 |
| 2007/0192853 | A1 * | 8/2007 | Shraim | G06Q 10/107 726/22 |
| 2007/0250916 | A1 * | 10/2007 | Shull | H04L 63/168 726/5 |
| 2007/0250919 | A1 * | 10/2007 | Shull | H04L 63/1416 726/7 |
| 2007/0294352 | A1 * | 12/2007 | Shraim | H04L 63/1483 709/206 |
| 2007/0294419 | A1 * | 12/2007 | Ulevitch | H04L 61/4511 709/230 |
| 2007/0294762 | A1 * | 12/2007 | Shraim | H04L 63/1491 726/22 |
| 2007/0299777 | A1 * | 12/2007 | Shraim | H04L 51/212 705/51 |
| 2007/0299915 | A1 * | 12/2007 | Shraim | H04L 63/1491 709/229 |
| 2008/0008348 | A1 * | 1/2008 | Metois | G06V 30/18 382/100 |
| 2008/0010292 | A1 * | 1/2008 | Poola | G06F 16/355 707/E17.118 |
| 2008/0034211 | A1 * | 2/2008 | Shull | H04L 61/4511 713/175 |
| 2008/0086638 | A1 * | 4/2008 | Mather | G06F 16/95 713/168 |
| 2008/0115214 | A1 * | 5/2008 | Rowley | G06F 21/31 726/22 |

| | | | | |
|---|---|---|---|---|
| 2008/0250159 | A1 * | 10/2008 | Wang | H04L 61/30 709/239 |
| 2008/0270203 | A1 * | 10/2008 | Holmes | G06Q 30/0201 705/7.29 |
| 2008/0320167 | A1 * | 12/2008 | Collignon | H04L 61/00 707/E17.115 |
| 2009/0182818 | A1 * | 7/2009 | Krywaniuk | H04L 51/212 709/206 |
| 2009/0240669 | A1 * | 9/2009 | Ando | G06Q 10/107 |
| 2010/0017218 | A1 * | 1/2010 | Gazetova | G06Q 30/02 705/1.1 |
| 2010/0043071 | A1 * | 2/2010 | Wang | H04L 63/1441 726/22 |
| 2011/0119268 | A1 * | 5/2011 | Rajaram | G06F 16/9566 707/E17.112 |
| 2011/0208513 | A1 * | 8/2011 | Nicks | G06F 40/205 704/10 |
| 2011/0208720 | A1 * | 8/2011 | Nicks | G06Q 30/00 707/723 |
| 2011/0208723 | A1 * | 8/2011 | Nicks | G06F 16/3338 707/723 |
| 2011/0208731 | A1 * | 8/2011 | Nicks | G06F 16/9566 707/765 |
| 2011/0208767 | A1 * | 8/2011 | Nicks | G06F 40/247 707/765 |
| 2011/0208800 | A1 * | 8/2011 | Nicks | G06F 16/90335 709/203 |
| 2011/0276716 | A1 * | 11/2011 | Coulson | G06F 16/9566 709/238 |
| 2012/0084860 | A1 * | 4/2012 | Cao | H04L 63/1441 726/23 |
| 2012/0110672 | A1 * | 5/2012 | Judge | H04L 51/212 709/206 |
| 2012/0158626 | A1 * | 6/2012 | Zhu | G06F 21/56 726/22 |
| 2012/0303808 | A1 * | 11/2012 | Xie | H04L 61/4511 709/225 |
| 2013/0086677 | A1 * | 4/2013 | Ma | H04L 63/1483 726/22 |
| 2013/0218847 | A1 * | 8/2013 | Saika | G06F 16/182 707/E17.002 |
| 2014/0058835 | A1 * | 2/2014 | Yudashkin | G06Q 30/02 705/14.49 |
| 2014/0149577 | A1 * | 5/2014 | Monighetti | H04L 69/22 709/224 |
| 2014/0201208 | A1 * | 7/2014 | Satish | G06F 21/564 707/737 |
| 2014/0298460 | A1 * | 10/2014 | Xue | H04L 63/1425 726/23 |
| 2015/0012495 | A1 * | 1/2015 | Prahlad | G06F 16/122 707/640 |
| 2015/0047033 | A1 * | 2/2015 | Thomas | H04L 63/1408 726/23 |
| 2015/0106494 | A1 * | 4/2015 | Bhuiyan | H04L 61/302 709/223 |
| 2015/0154720 | A1 * | 6/2015 | Matkowsky | G06Q 50/184 705/310 |
| 2015/0215271 | A1 * | 7/2015 | Gupta | G06F 16/951 707/722 |
| 2015/0278373 | A1 * | 10/2015 | Roach | G06F 16/9535 707/706 |
| 2016/0055424 | A1 * | 2/2016 | Kalagnanam | G06Q 30/0282 706/12 |
| 2016/0065534 | A1 * | 3/2016 | Liu | G06F 16/951 707/728 |
| 2016/0294852 | A1 * | 10/2016 | Hagen | H04L 61/301 |
| 2016/0294859 | A1 * | 10/2016 | Choi | G06F 21/00 |
| 2016/0380977 | A1 * | 12/2016 | Bean | G06F 21/566 726/12 |
| 2017/0054761 | A1 * | 2/2017 | Schryver | G06F 16/2379 |
| 2017/0126723 | A1 * | 5/2017 | Wang | G06F 40/226 |
| 2017/0126730 | A1 * | 5/2017 | Oberheide | H04L 63/1483 |
| 2017/0237773 | A1 * | 8/2017 | Wallace | H04L 9/0643 726/22 |
| 2018/0234368 | A1 * | 8/2018 | Everton | G06Q 10/107 |
| 2019/0050559 | A1 * | 2/2019 | Mccarty | H04L 63/1441 |

(56) References Cited

U.S. PATENT DOCUMENTS

| | | | | | |
|---|---|---|---|---|---|
| 2019/0164054 | A1* | 5/2019 | Lee | G06F 16/355 |
| 2019/0171809 | A1* | 6/2019 | Sakib | G06F 9/445 |
| 2019/0238576 | A1* | 8/2019 | Weber | H04L 61/3025 |
| 2020/0053119 | A1* | 2/2020 | Schnieders | G06V 10/761 |
| 2020/0065616 | A1* | 2/2020 | Xu | G06F 18/23213 |
| 2020/0159925 | A1* | 5/2020 | Parlak | G06F 21/53 |
| 2020/0195694 | A1* | 6/2020 | Kalinin | G06Q 10/107 |
| 2020/0213347 | A1* | 7/2020 | Kalinin | G06F 21/56 |
| 2020/0304540 | A1* | 9/2020 | Chang | G06N 20/00 |
| 2020/0311259 | A1* | 10/2020 | Schmugar | G06F 21/554 |
| 2020/0351244 | A1* | 11/2020 | Moore | H04L 63/0245 |
| 2020/0358798 | A1* | 11/2020 | Maylor | H04L 63/1433 |
| 2020/0382551 | A1* | 12/2020 | Harris | H04L 63/1483 |
| 2021/0021638 | A1* | 1/2021 | Lancioni | H04L 63/1483 |
| 2021/0120035 | A1* | 4/2021 | Onut | H04L 63/1483 |
| 2021/0136032 | A1* | 5/2021 | Kim | H04L 63/1425 |
| 2021/0141897 | A1* | 5/2021 | Seifert | G06F 21/566 |
| 2021/0160280 | A1* | 5/2021 | Yadav | G06F 18/22 |
| 2021/0266335 | A1* | 8/2021 | Medalion | G06F 16/285 |
| 2021/0312041 | A1* | 10/2021 | Gururajan | G06F 21/554 |
| 2021/0359977 | A1* | 11/2021 | Paranjpe | G06N 20/00 |
| 2022/0200941 | A1* | 6/2022 | Lancioni | G06F 40/242 |
| 2023/0252148 | A1* | 8/2023 | Hatekar | G06F 21/53<br>726/23 |
| 2024/0015180 | A1* | 1/2024 | Locar | H04L 63/1483 |

* cited by examiner

REPUTATION CLUSTERS FOR UNIFORM RESOURCE LOCATORS

FIELD OF THE SPECIFICATION

This application relates in general to network security, and more particularly, though not exclusively, to a system and method for providing reputation clusters for uniform resource locators.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
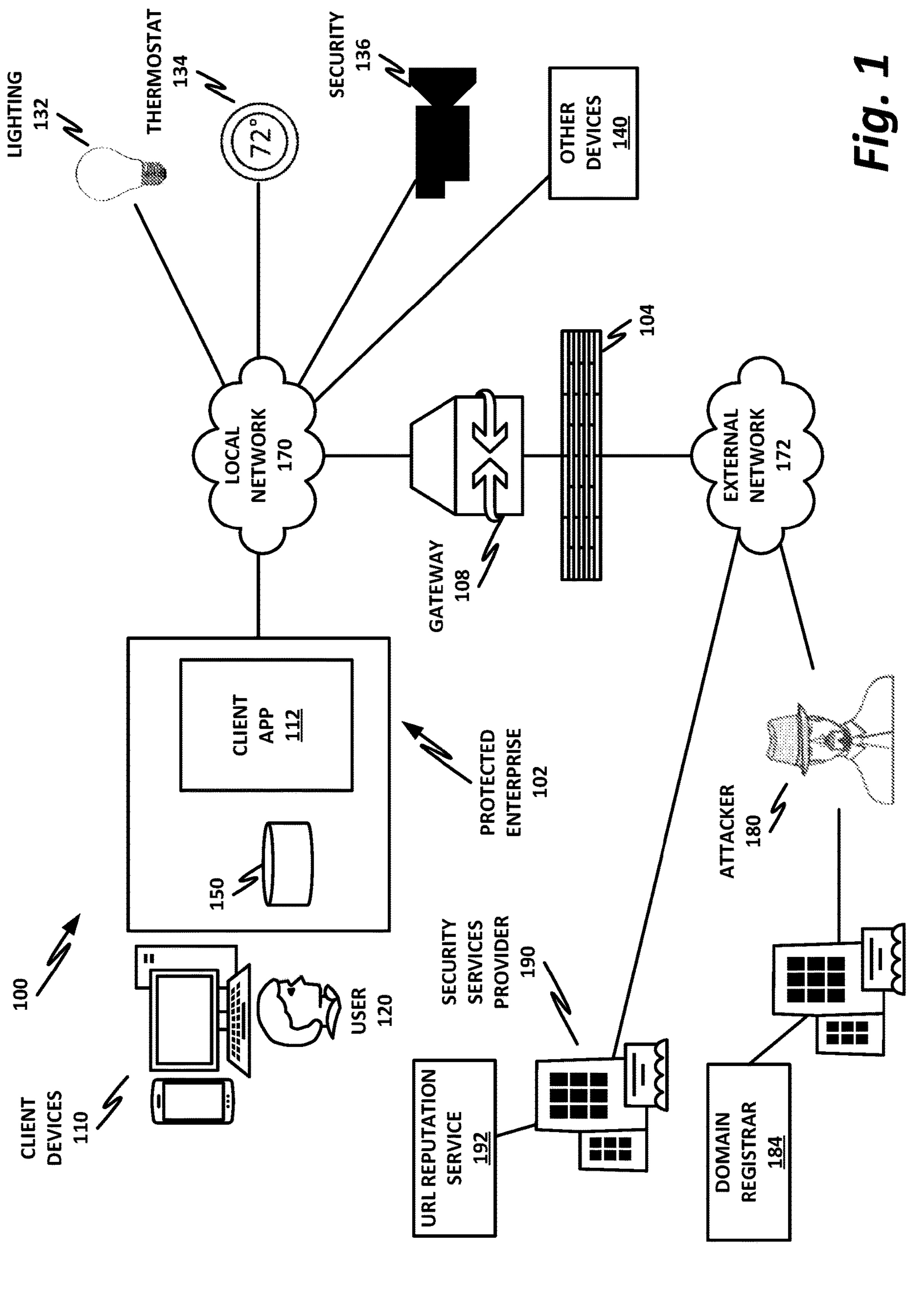
FIG. 1 is a block diagram of selected elements of a security ecosystem.

In an example, there is disclosed one or more tangible, non-transitory computer-readable storage media, comprising instructions to: enumerate domain names newly registered in a time window; build a dictionary from the newly registered domain names; cluster the domain names, comprising performing a spell check with the dictionary to identify similar domain names; for a selected cluster, identify one or more domain names with an assigned reputation; and if a portion of assigned reputations exceeds a threshold of bad reputations, assign cluster-based bad reputations to domains in the cluster with unknown reputations.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

One beneficial service that a security services provider may provide is URL reputation services. These can be used to protect both home and enterprise end users while browsing the web. For example, MCAFEE, LLC operates the Global Threat Intelligence (GTI) database. GTI provides reputations for URLs. This can indicate whether a URL is trusted or untrusted, can provide a URL category, and can indicate whether a URL is a phishing website or otherwise hosts malicious or undesirable information.

This provides a valuable protection for users while surfing the web. Indeed, web reputation services are a critical security mechanism that protects millions of customers worldwide from internet threats. However, the process of assigning web reputations to URLs is complex, and may involve multiple methods and processes that are used to classify the URL to determine if a site can be trusted. This can include scanning the URL for malicious objects being served, looking for phishing content, checking for data collection, looking for known malicious content, and others.

In a given day, hundreds of thousands to millions of URLs may be created. With hundreds to thousands or millions of URLs to scan each day, it can be challenging for a security services provider with a web reputation system to keep up with accurate web reputations for all of the new URLs. Furthermore, the web reputation system may also need to periodically update reputations for known URLs. Thus, the workload on web reputation servers can be very substantial. Because it is not always practical to assign new URLs reliable reputations in real time, it is common for users to encounter "unknown" reputations for some websites. This may include websites that the web reputation provider has not yet had a chance to accurately process, convict, or pass. During this interim time, when some URLs are unknown, end users are at risk of visiting a URL that may include malicious content.

One common use case relates to mass domain registrations. In some cases, bad actors will perform bulk domain registrations, often for malicious purposes. These can be done in bulk transactions with small variations between the domain names. Commonly, these domain names leverage typo squatting, or in other words, common or expected misspellings of legitimate domain names. These typo squatting domains can then be used in campaigns to increase site traffic, and/or to cull user information.

In an illustrative example, a malicious actor may register 40 similar domain names in one bulk transaction. During analysis, one or a few of these domain names may be classified with a bad reputation, such as "untrusted." However, other domain names in the same batch may be classified as "unknown." This indicates that the web reputation has not been computed for these unknown sites. Therefore, customers that visit these other, unknown reputation sites are still at risk—even though they were registered in a bulk transaction with the same registrant as a domain that has already been convicted as malicious. While it would be convenient to convict all domains that were registered in the same bulk transaction, that information is not always available. For example, domain registrars may be required to publish new domain registrations, but they do not necessarily publish information about the transactions that led to those domain registrations.

In another use case, malware authors take advantage of trending news and current events to register domains that leverage popular buzzwords. For example, in the wake of a massive hurricane, a malicious actor could register a large number of domains that include the name of the hurricane, and words such as "care," "relief," or similar, to try to exploit or phish users that encounter those sites. They often place these domains in emails that they then send to victims to entice them to visit a malicious website. For example, when natural disasters strike, it is common to see an increase in related domains that try to scam people into thinking they're making a donation to help those affected by the disaster. In fact, they are being phished, scammed, or defrauded.

Embodiments of the present specification provide a system for propagating a consensus reputation of a cluster of unknown domains. This can significantly reduce the number of unknowns, and can help to identify domains that were registered in a mass transaction. This provides instant detection for domains that are related to a domain that has already been convicted as untrusted. In some cases, the reputation for these other domains may be temporary, and may have a timeout. Thus, the analysis system may still perform an independent analysis of these domains. But in the meantime, the domains are treated as untrusted because of their relationship to other untrusted and trusted domains. Thus, the user is protected and tolerant the propagation is verified by more traditional reputation assignment mechanisms. This increases zero-day customer protection without incurring additional costs for existing web reputation systems.

In an illustrative example, clusters of new domain registrations can be discovered by applying a typo squatting detection mechanism. Clusters of domains can then be identified, and a cluster reputation consensus can be computed. The cluster reputation consensus can then be applied to all of the unknown domains within the cluster.

This provides a system that discovers new domain registration clusters, computes a cluster reputation, and propagates the reputation to unknown clusters. This provides protection for users against zero-day-type exploits.

Advantageously, this system realizes advantages over case-by-case analysis. In a case-by-case system, each URL or domain is independently analyzed. This is a beneficial approach, and indeed is part of certain embodiments of the present specification. However, this approach is costly and does not scale well when there is a need to react immediately to hundreds of thousands or millions of URLs observed in a given day. Generally, a web reputation system may implement a queue that can take hours or days to process. And ultimately, it may be beneficial to process each of those domains. In the interim, the present system can derive large numbers of reputations—on the order of hundreds of thousands or millions—in a matter of seconds, by grouping similar domains into clusters. A cluster reputation can then be assigned to all unknown domains within the cluster, with an expiry attached to the cluster reputation, so that ultimately an individual analysis on that domain can be performed.

In this case, domains can be treated as a matrix operation when clusters are discovered. By clustering the domains, the system can gain additional metadata that can help make better decisions more quickly without initially needing to collect extensive data about each site, or waiting for third-party or telemetry traffic to identify something bad occurring.

Furthermore, existing reputation telemetry systems may lack some visibility into domains that are inactive, or that are not visited by customers of the web reputation system. This means that new domain registrations owned by malicious actors may be in a dormant state. In the dormant state, the domains may be benign. But these benign, dormant URLs may be waiting for a campaign to go live. Thus, these malicious domains can be missed by a web reputation system. A system of the present specification handles this limitation by providing a proactive web reputation of a new domain registration, regardless of the state of the URL (e.g., parked, inactive, dormant, or similar). This proactive web reputation assignment strategy is useful in mitigating zero-day phishing campaigns, or other types of malicious activities.

In an example, the system starts by identifying a sliding window. A useful sliding window may be, for example, on the order of 24 to 48 hours. It is advantageous to keep this time period relatively short, as it identifies domains that are related not only by character similarity, but also by temporal proximity. This can help to identify bulk registrations, which generally happen within an order of a few days. While it is possible to extend this time period—and even to extend it indefinitely—doing so can increase the false positive rate, as this may identify clusters of domains that are not related by a time variable. However, this specification specifically anticipates embodiments where it is desirable to identify such clusters, and where the domain list is not temporally related.

In an example where it is desirable to identify a bulk registration, the sliding window for analyzing domains may be between approximately one and five days, and in particular on the order of 24 to 48 hours.

The system may then query a registrar for new domain names registered within the sliding window. Once a list of new domain registrations is obtained, a symmetric spelling correction dictionary is created. This is a dictionary containing all of the domains that appear in the new registration list. Optionally, the top-level domain (e.g., ".org," ".com," or similar) may be omitted from the dictionary. A symmetric spelling dictionary engine can then scan the domains using the domain registrations themselves as its dictionary. This will cause the symmetric spelling engine to find or cluster similar domains based on the required edit distance to "spell correct" the terms.

This technique is quite fast, as it provides a linear resolution time, and can quickly create groups of spell corrected domains. Then, using this dictionary, the system can attempt to spell correct all of the new domain names that are below a maximum edit distance threshold. For example, if it identifies two similar domains, they will be spell corrected to each other. To provide just one example, a typo squatter may register "mcafei.com" and "mcafee.com." Both of these may be typo squatted domains that are attempting to divert traffic intended for "mcafee.com." In this example, mcafee.com does not actually appear in the dictionary, because it is not part of the batch of domains that were registered together. However, both of the misspelled domain names do appear in the dictionary. Thus, when the symmetric spelling engine scans the list, it first discards exact matches. In other words, the domain "mcafei" is not allowed to match to itself, but rather should be identified as a misspelling that does not appear in the dictionary. Once the system identifies "mcafei" as a misspelling, it will search the dictionary for words that are similar enough that they may be suggested as spelling corrections. In this case, the system will find mcafae.com as a suggested correct spelling for mcafei.com. This indicates that the words are a match, and should therefore be clustered together. An appropriate distance threshold can be set, to increase the sensitivity of the match.

As additional words in the dictionary are matched to one another, a cluster emerges. Because the operation is performed for all domains in the set, it is expected that there will be many duplicate clusters at the end of the exercise. For example, just as "mcafei" is matched to "mcafae," "mcafae" may also match to "mcafei." These redundant matches of the form A→B=B→A can be removed from the data set. This leaves only one of the matches to use for clustering operations. Note that it is also possible to encounter malicious domains that are not typo squatting, but that append or prepend content to a legitimate domain. For example, a typo squatter may register a domain like "Ilovemcafee.com." For these cases, the spelling correction algorithm may be complemented with a substring containment analysis, so that relevant clusters can be obtained. This can extend the current method beyond simple typo squatting cases.

Once all of the deduplicated clusters have been identified, the system can proceed with the web reputation harvesting phase. Because the domains were registered during the sliding window (e.g., 24 to 48 hours), it is possible that the web reputation system may have already assigned a reputation for some of the domains. These reputations can be collected, and then mapped with the corresponding domains in the clusters. If a cluster is observed to contain a significant number or a plurality of untrusted or bad reputations, then it is likely that the other similar domains are bad, as well. This is particularly true if the domains were, in fact, registered in a bulk transaction. Thus, the bad reputation assigned by analysis to a subset of domains in the cluster can be temporarily imputed to other domains in the cluster, until those domains can themselves be analyzed.

Advantageously, this system significantly reduces the number of unknown reputations of a web reputation system while a new batch of domains is being analyzed. It also provides a temporary web reputation from the moment a new domain is registered and identified as belonging to a cluster. This is an improvement over having to wait hours or days for enough metadata about the domain to be collected to influence the traditional web reputation calculation. It also provides a way for web analysts to look at clusters of websites as a whole and provide content categories and web reputations, which makes the evaluation process faster.

Another advantage is that this system provides zero-day protection against unknown reputation domains that are dormant and waiting to be activated during a malicious campaign. This system can also steer-correct misclassifications, or raise an alert when outliers are observed or determined on either very trusted or very untrusted reputation clusters. The system can also identify trending topics that are often sources of malware. Furthermore, the system can provide branch protection against entities by monitoring for similar domains to protect their online presence.

The foregoing can be used to build or embody several example implementations, according to the teachings of the present specification. Some example implementations are included here as nonlimiting illustrations of these teachings.

There is disclosed an example of one or more tangible, non-transitory computer-readable storage media, comprising instructions to: enumerate domain names newly registered in a time window; build a dictionary from the newly registered domain names; cluster the domain names, comprising performing a spell check with the dictionary to identify similar domain names; for a selected cluster, identify one or more domain names with an assigned reputation; and if a portion of assigned reputations exceeds a threshold of bad reputations, assign cluster-based bad reputations to domains in the cluster with unknown reputations.

There is further disclosed an example of one or more tangible, non-transitory computer-readable storage media, wherein the cluster-based bad reputations are temporary reputations, and wherein the instructions are further to assign an expiry to the cluster-based bad reputations.

There is further disclosed an example of one or more tangible, non-transitory computer-readable storage media, wherein building the dictionary comprises removing top-level domains from the domain names.

There is further disclosed an example of one or more tangible, non-transitory computer-readable storage media, wherein the instructions are further to provide defensive registration detection.

There is further disclosed an example of one or more tangible, non-transitory computer-readable storage media, wherein the defensive registration detection comprises determining that at least some domains in the selected cluster share domain metadata with a domain registered before the time window.

There is further disclosed an example of one or more tangible, non-transitory computer-readable storage media, wherein the spell check is a symmetric spell check.

There is further disclosed an example of one or more tangible, non-transitory computer-readable storage media, wherein the instructions are further to deduplicate the selected cluster.

There is further disclosed an example of one or more tangible, non-transitory computer-readable storage media, wherein the threshold of bad reputations is a simple majority.

There is further disclosed an example of one or more tangible, non-transitory computer-readable storage media, wherein the time window is between approximately 24 and 48 hours.

There is further disclosed an example of one or more tangible, non-transitory computer-readable storage media, wherein the time window is less than seven days.

There is further disclosed an example of one or more tangible, non-transitory computer-readable storage media, wherein the instructions are further to determine that an insufficient number of domains in the selected cluster have a reputation, and prioritize analysis of domains in the cluster.

There is further disclosed an example of one or more tangible, non-transitory computer-readable storage media, wherein the instructions are further to determine that a supermajority of domains with reputations in the selected cluster have bad reputations, and mark domains in the selected cluster with good reputations for additional analysis.

There is further disclosed an example of one or more tangible, non-transitory computer-readable storage media, wherein the supermajority is at least ⅔.

There is further disclosed an example of one or more tangible, non-transitory computer-readable storage media, wherein the supermajority is at least 97%.

There is further disclosed an example of one or more tangible, non-transitory computer-readable storage media, wherein the instructions are further to provide substring containment on domain names in the selected cluster.

There is further disclosed an example of one or more tangible, non-transitory computer-readable storage media, wherein enumerating domain names newly registered comprises scanning a plurality of registrars.

There is also disclosed an example domain name security cloud service, comprising: a cloud hardware platform; a scanning engine to build a list of domains registered within a time window; a clustering module to cluster newly registered domains according to textual similarity; a reputation engine to: select a cluster; identify domains within the cluster with existing reputations; and if a majority of the domains with existing reputations are untrusted, assign an untrusted reputation to domains within the cluster that lack existing reputations; and an endpoint application programming interface (API) to serve domain reputations to endpoints.

There is further disclosed an example domain name security cloud service, wherein clustering the newly registered domains comprises building a spelling dictionary from the newly registered domains, and applying a spellcheck algorithm.

There is further disclosed an example domain name security cloud service, wherein untrusted reputations within the cluster are temporary reputations, and wherein the reputation engine is further to assign an expiry to the untrusted reputations.

There is further disclosed an example domain name security cloud service, further comprising building a dictionary, comprising removing top-level domains from the domain names.

There is further disclosed an example domain name security cloud service, wherein the cloud service is further to provide defensive registration detection.

There is further disclosed an example domain name security cloud service, wherein the defensive registration detection comprises determining that at least some domains in the cluster share domain metadata with a domain registered before the time window.

There is further disclosed an example domain name security cloud service, further comprising providing a spell check, wherein the spell check is a symmetric spell check.

There is further disclosed an example domain name security cloud service, wherein the reputation engine is further to deduplicate the selected cluster.

There is further disclosed an example domain name security cloud service, wherein the majority of the domains with an existing reputation is a simple majority.

There is further disclosed an example domain name security cloud service, wherein the time window is between approximately 24 and 48 hours.

There is further disclosed an example domain name security cloud service, wherein the time window is less than seven days.

There is further disclosed an example domain name security cloud service, wherein the reputation engine is further to determine that an insufficient number of domains in the selected cluster have a reputation, and prioritize analysis of domains in the cluster.

There is further disclosed an example domain name security cloud service, wherein the reputation engine is further to determine that a supermajority of domains with reputations in the selected cluster have untrusted reputations, and mark domains in the selected cluster with good reputations for additional analysis.

There is further disclosed an example domain name security cloud service, wherein the supermajority is at least ⅔.

There is further disclosed an example domain name security cloud service, wherein the supermajority is at least 97%.

There is further disclosed an example domain name security cloud service, wherein the reputation engine is further to provide substring containment on domain names in the selected cluster.

There is further disclosed an example domain name security cloud service, wherein enumerating domain names newly registered comprises scanning a plurality of registrars.

There is also disclosed an example computer-implemented method of providing domain name security, comprising: scanning a plurality of domain registrars to create a list of domain names registered within a bounded time; clustering the domain names according to textual similarity; for a cluster, determining that a majority of domain names with known reputations have a negative reputation; and assigning to domain names in the cluster without known reputations the negative reputation of the majority.

There is further disclosed an example method, wherein the negative reputation assigned to domain names in the cluster are temporary reputations, and further comprising assigning an expiry to the negative reputation.

There is further disclosed an example method, further comprising building a dictionary, including removing top-level domains from the domain names.

There is further disclosed an example method, further comprising providing defensive registration detection.

There is further disclosed an example method, wherein the defensive registration detection comprises determining that at least some domains in the cluster share domain metadata with a domain registered before the bounded time.

There is further disclosed an example method, further comprising applying a spell check algorithm to the domain names to identify similar domain names, wherein the spell check algorithm comprises a symmetric spell check.

There is further disclosed an example method, further comprising deduplicating the cluster.

There is further disclosed an example method, wherein the majority is a simple majority.

There is further disclosed an example method, wherein the bounded time is between approximately 24 and 48 hours.

There is further disclosed an example method, wherein the bounded time is less than seven days.

There is further disclosed an example method, further comprising determining that an insufficient number of domains in the cluster have a reputation, and prioritizing analysis of domains in the cluster.

There is further disclosed an example method, further comprising determining that a supermajority of domains with reputations in the cluster have bad reputations, and mark domains in the cluster with good reputations for additional analysis.

There is further disclosed an example method, wherein the supermajority is at least ⅔.

There is further disclosed an example method, wherein the supermajority is at least 97%.

There is further disclosed an example method, further comprising providing substring containment on domain names in the cluster.

There is further disclosed an example method, wherein scanning a plurality of registrars to create a list of domain names registered within a bounded time further comprises enumerating domain names newly registered.

An apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

A system and method for providing reputation clusters for uniform resource locators will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the Internet, via external network 172. External network 172 may similarly be any suitable type of network.

Local network 170 may connect to the Internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a standalone Internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious content into client device 110. When attacker 180 is developing malicious content, the attacker may attempt to deliver that malicious content via a malicious website. Attacker 180 could bulk register a large number of domain names, such as typo squatting domain names with domain registrar 184.

Once the malicious content gains access to client device 110, it may try to perform work such as social engineering of user 120, a hardware-based attack on client device 110, modifying storage 150 (or volatile memory), modifying client application 112 (which may be running in memory), or gaining access to local resources. Client app 112 could be a web browser or other internet enabled application that accesses URLs according to a domain name. Domain name-based security may be provided as an application on client device 110, or via gateway 108, where gateway 108 may provide a recursive domain name system (DNS) server that queries the reputation of domain names before resolving them.

Attacks may also be directed at IoT devices such as lighting 132, thermostat 134, security device 136, and other devices 140 may also access various URLs to perform their internet enabled functions. IoT devices can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work.

In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions.

Security services provider 190 may operate a URL reputation service 192, which may include a global database of URLs and associated reputations. The reputations could include, for example, trusted, untrusted, unknown, or other degrees of granularity. An untrusted domain is one that is known to host malware, or that engages in phishing or other malicious activity.

In some cases, security services provider 190 may include a threat intelligence capability such as the GTI database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
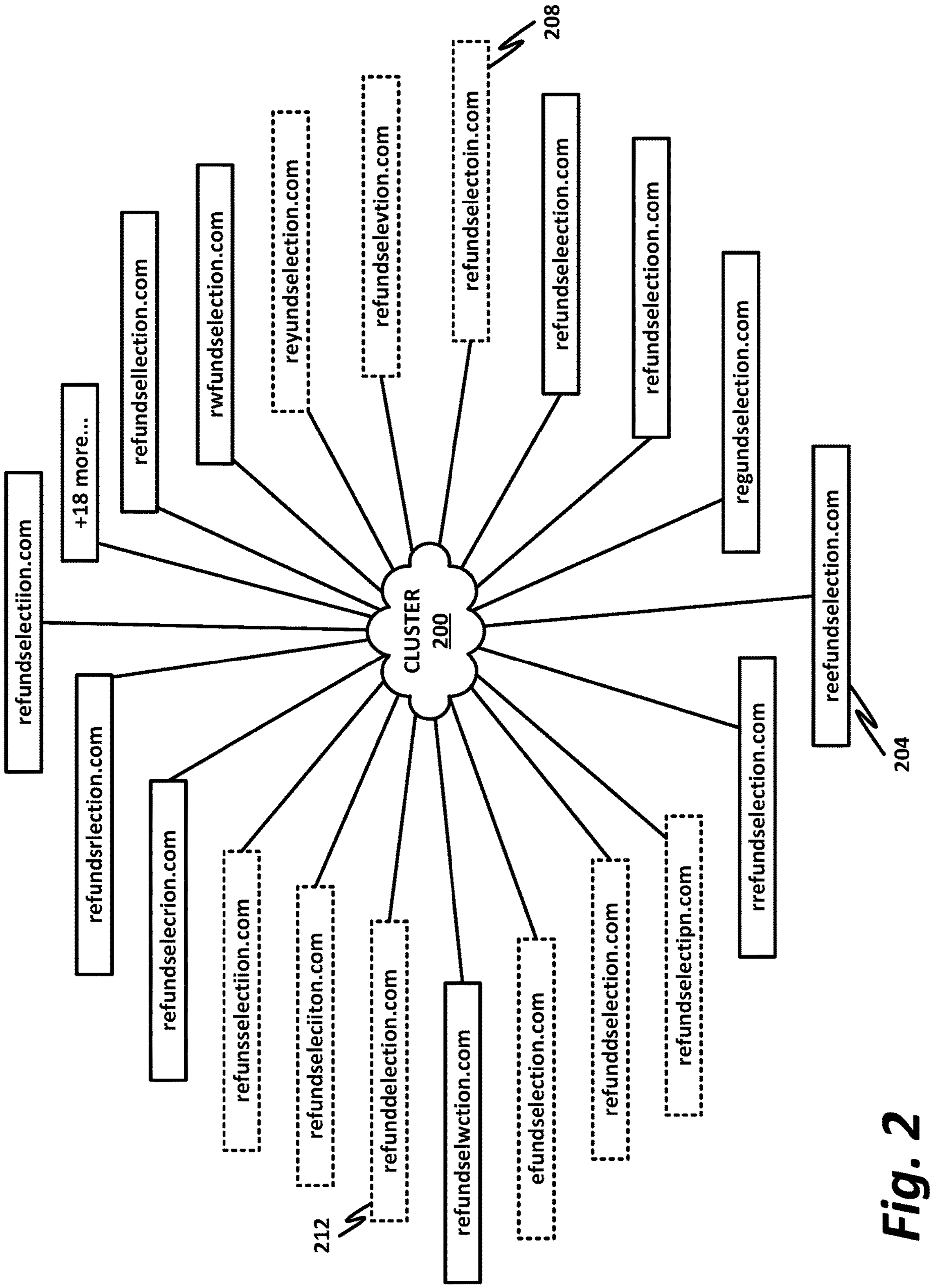
FIG. 2 illustrates a cluster of newly registered domain names.

FIG. 2 illustrates a cluster 200 of newly registered domain names. In this illustrative example, cluster 200 contains approximately 38 newly registered domain names, that were all registered in a period of approximately 24 hours. When a URL reputation system is queried for one of these domains, it may see that some of them already have a bad reputation.

In this illustration, some domains have a negative or untrusted reputation, such as domain name 204, where "refundselection" is misspelled as "reefundselection." Other domain names illustrated here with a solid line around them have a similar, already determined, untrusted or bad reputation.

Other domain names, such as domain name 208, have an unknown reputation. For example, domain name 208 is misspelled "refundselectoin." This domain name has not yet been analyzed, or there is insufficient information to analyze it to assign it a reputation.

However, this cluster includes domains that are near enough to one another, spelling-wise (e.g., within the maximum edit distance), that they can be clustered together. Furthermore, the fact that they were all registered within the sliding window (e.g., 24 to 48 hours), means that is a reasonable assumption that these may have been registered as a batch. Thus, when the domain reputation database queries one of these domains, it may find that some of the domains in the cluster already have a bad reputation, as shown by the solid lines. Those domains with dotted lines around them indicate an unknown reputation. Since all of these were registered in a short time period, and have very similar names, it is also reasonable to assume that they may have been registered by the same entity. Thus, if a number of these have a bad reputation, then it is also reasonable to assume that the ones with unknown reputations have a similar bad or untrusted reputation.

In this example, the endpoint or client queries the cloud service for a domain name, and the cloud service determines that the domain name does not yet have a known reputation. However, the cloud service may have a data store of clusters, and some objects in the cluster have a known reputation. Thus, if the endpoint queries "refunddelection.com," the cloud service determines that refunddelection.com does not have a known reliable reputation. However, before returning an unknown reputation to the endpoint, the cloud service queries its cluster database, and finds that refunddelection-.com 212 belongs to cluster 200. It may then poll other URLs within the same cluster, to determine how many have an already known reputation. This may be a majority voting. In other words, of the domains with a reputation, do the majority have a trusted reputation? In this case, more than a majority, all domains with a reputation have a bad reputation. Thus, this bad reputation is propagated to the other unknown domains in the same cluster. This leverages the metadata of the cluster to improve coverage of the web reputation system without incurring an additional cost, such as visiting or processing unknown URLs using a traditional web reputation system. These systems are relatively expensive and slow with respect to the clustering algorithm, and thus, it is faster to assign reputations to clusters.

In the example above, the clustering determination and query are performed when a query is made by the endpoint. However, this can also be done in advance. Furthermore, the reputation assigned to unknown URLs in the cluster may be a temporary reputation that can be superseded later, when a full analysis is done. This reputation propagation mechanism provides a short-term protection, which provides in particular protection from zero-day malicious domains. By flagging the domains with a propagated or cluster-based reputation with an expiry date, it is ensured that they will receive a more traditional analysis later on. The expiry date is a safeguard measure to allow the system to naturally classify the domains when time, opportunity, and sufficient resources are available. This ensures that the neighborhood-based or cluster-based reputation does not become the permanent reputation for the URL.

Figure 3:
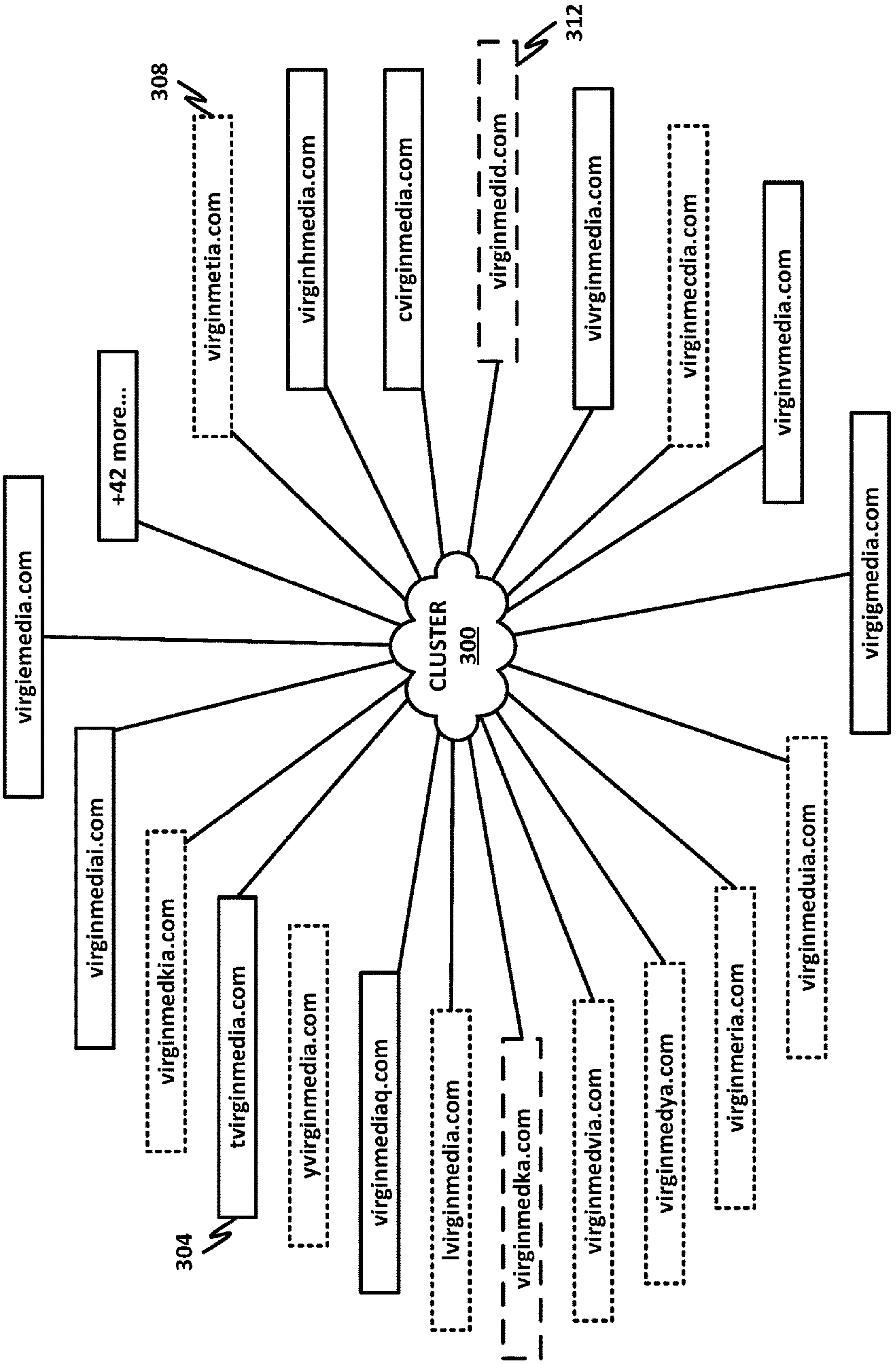
FIG. 3 illustrates an example of a cluster with similar attributes.

FIG. 3 illustrates an example of a cluster 300 with similar attributes. In this case, the URLs appear to cluster around the legitimate domain name "virginmedia.com." Here, there is a large number of URLs (more than 50) in the cluster. However, in addition to URL 304 (which has a bad reputation) and URL 308 (which has an unknown reputation), URL 312 (indicated by a dashed line) has a good or trusted reputation.

The situation where there is a mixture of good and bad reputations makes the inference that the whole cluster can be assigned a group reputation less tenable. However, a mixture of reputations does not necessarily defeat the method. As described above, if at least a majority of assigned reputations are bad, then the other URLs may be assigned a bad reputation. If a majority are good, then in one embodiment, the URL is not assigned a temporary reputation. Rather, the URL reputation service continues to return an unknown reputation for that URL. Alternatively, if a majority of the reputations are good, a good reputation could also be returned.

However, as illustrated in FIG. 3, if a super majority of reputations are bad, but there are a few good reputations interspersed within those bad reputations, this may also indicate something unusual is happening. For example, this could indicate a case where a bad actor has performed a bulk registration of domains. Some of the domains are used as a distraction and are parked, for example, with a static HTML parking page. This static HTML parking page has taken no malicious action, yet, and has no recognizable malicious code, and thus an analysis of this URL may determine that the URL is trusted. But if only one, two, or a handful of domains in a large cluster have a trusted reputation, while the others have an untrusted or bad reputation, this may indicate that the small number of trusted URLs are actually being used as a distraction. This could be determined to be an anomaly in the cluster reputation harvesting operation. For example, this could be a signal to analysts that it is desirable to revisit those previously trusted reputations that are in the minority by a large factor.

In the example of FIG. 3, most of the domains in cluster 300 were registered within a short time period, such as 24 to 48 hours. Furthermore, a super majority of these URLs have a malicious or untrusted reputation. In this case, just two of the domains are considered trusted. Because of the very small minority of domains that are considered trusted, it may be useful to revisit these reputation assignments, or to extend the analysis to make a further determination. In one example, a defensive registration module is also provided. This defensive registration module is described below.

In the case of cluster 300, it is more likely that the two trusted domains are either a reputation assignment mistake (false negative), or a bad actor's distraction strategy. Alternatively, it is possible that this represents a defensive registration.

A defensive registration module may be one that considers the scenario where a legitimate company registers new domains that are typo squatting domains similar to their own legitimate brands or domains. This defensive registration technique is quite common among security-aware companies that want to proactively protect themselves from potential bad actors attempting to exploit their brand using typo squatting. In order to mitigate false positives that arise from defensive registrations, a defensive registration module may be included as an extension.

For a defensive registration module, the spelling correction dictionary may be extended to include known or legitimate domains seen by the web reputation system. These legitimate domains may be ones that were not registered in bulk, for example, within the sliding window of 24 to 48 hours. For example, "mcafee.com" is a known legitimate domain that has been registered for many years. Thus, mcafee.com could be included as a candidate of the extended dictionary. Based on the extended dictionary, the domains in the cluster may be compared against the reference domain, in this example mcafee.com. This could include, for example, checking the consistency of the WHOIS and internet protocol (IP) range data for the clustered domains.

If the registrar/registrant/IP ranges of the newly registered domains are consistent with the reference domain, then this may be considered a defensive registration. In that case, reputation propagation is not performed on defensive registrations in the cluster. In other words, any registrations in the cluster that have the consistent IP address or other metadata with the legitimate domain are not treated as being suspect. However, other typo squatting type domains that do not have consistent metadata may still be treated as suspect within the cluster.

On the other hand, if a newly registered domain or domains are observed to belong to different registrants, or they happen on diverse registrars and with IP ranges falling outside the range expected for the reference domain, then it is unlikely that this is a defensive registration. In that case, the web reputation propagation is performed, as described above.

Figure 4:
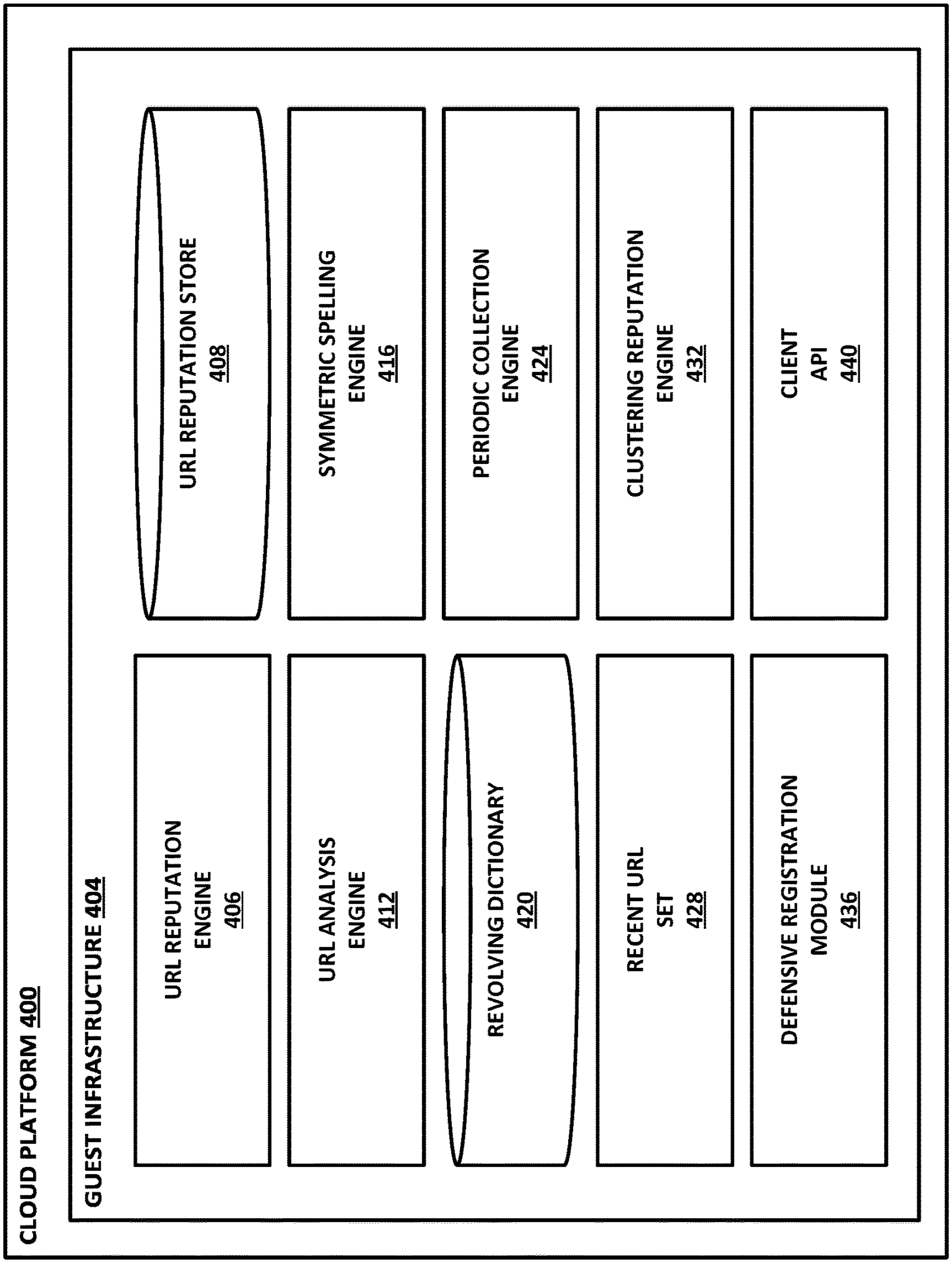
FIG. 4 is a block diagram of a cloud platform.

FIG. 4 is a block diagram of a cloud platform 400. Cloud platform 400 may be configured to provide a system to implement methods or processes disclosed in the present specification.

In this case, cloud platform 400 may include an appropriate hardware platform. For example, cloud platform 400 could include a server, a cluster of servers, a supercomputer, a high-powered computing node, a data center, or similar. This provides the appropriate hardware and software infrastructure to run the modules disclosed herein.

Cloud platform 400 provides a guest infrastructure 404. Guest infrastructure 404 may provide hardware and software infrastructure for virtualization, containerization, microservices, and other guest services. This may include the hardware and software utilities for managing the guest infrastructure. Thus, each of the modules or engines disclosed herein could be provided on a standalone microservice, virtual machine, container, or other. In these cases, the systems may provide a virtualized hardware interface, including a virtual processor and virtual memory, but these would ultimately map to a physical hardware such as a physical processor and physical memory. This could also include accelerators, coprocessors, and other utilities.

Cloud platform 400 provides various modules including, by way of illustrative and nonlimiting example, a URL reputation store 408, a URL analysis engine 412, a symmetric spelling engine 416, a revolving dictionary 420, a periodic collection engine 424, a recent URL set 428, a clustering reputation engine 432, a defensive registration module 436, and a client API 440. These various modules and elements may be provided as discrete or separate units, such as discrete or separate virtual machines or containers, or more than one could be combined in a single unit. Furthermore, in other cases, one module or element could be spread across a plurality of virtual machines or containers to provide different pieces of a function. For example, one common method in both virtual machines and containers is to provide a "stack" of different utilities, all provided on a discrete processing unit.

URL reputation store 408 may be a database or data store of URL reputations. This could include reliable reputations that have already been computed for URLs that have been analyzed in detail. It could also include a store of clustered reputations, such as those that are inferred from clustering of similar domain names. In some cases, a URL reputation engine 406 may be provided to provide a reputation service. For example, security services provider 190 of FIG. 1 is an illustration of a provider of such a service. An end user, a gateway, or other queries the URL reputation engine 406 via client API 440 before visiting a domain name. This provides a useful security mechanism for the end user, and helps the end user to avoid domains with bad or negative reputations.

URL analysis engine 412 may be used to analyze various URLs. There are a number of known techniques for analyzing URLs, and URL analysis engine 412 could use any number of these. Although this is a nonlimiting and nonexclusive example, it may be considered that URL analysis engine 412 is designated as performing a more detailed or reliable analysis, and may provide a permanent reputation for URLs that it analyzes. In this case, a permanent reputation means one that does not have a definite expiry, but that persists until it is superseded. Thus, while a URL may be re-analyzed from time to time to update its reputation, there is no fixed expiry for a permanent reputation.

Symmetric spelling engine 416 is an engine that performs a symmetric spelling algorithm. There are a number of known spelling algorithms, such as Burkhard-Keller Tree (BK-Tree), Levenshtein, Damerau-Levenshtein, Hamming distance, Jaro-Winkler distance, strike a match, and others.

Common symmetric spelling algorithms rely on a dictionary. The dictionary includes known or "correct" words, and then is used to compute a logical distance between a word and a correct word within the dictionary. In this case, the dictionary is not a static dictionary, but rather a revolving dictionary 420. Revolving dictionary 420 is populated for each instance of the algorithm with the domain names that have been collected within the sliding window. For example, it could include domain names collected within the last 24 to 48 hours. In some cases, domain names are added to the dictionary without the top-level domain (TLD). Thus, terminal parts of the domain name such as ".com," ".org," ".net," or similar are removed from the domain name. This means that the more substantive part of the domain name is what is actually used in the symmetric spelling algorithm.

Periodic collection engine 424 may be configured to collect domains that have been registered within a sliding window. For example, periodic collection engine 424 may periodically poll domain registrars for public data, such as WHOIS data. These data will reveal which domains have been registered within the sliding window. Periodic collection engine 424 collects these domain names, and then loads the domain names (optionally stripped of the TLD) into recent URL set 428.

Clustering reputation engine 432 may then take from recent URL set 428 all of the domain names that have been collected, optionally strip out the TLD, and load them into revolving dictionary 420. Clustering reputation engine 432 then carries out an algorithm to determine which domains belong in a cluster. Once clusters have been identified, clustering reputation engine 432 may also analyze the cluster to determine whether there are domains with already assigned reliable reputations. If there are, then clustering reputation engine 432 can determine, based on those existing reputations, whether to assign a reputation to other unknown URLs within the cluster.

If clustering reputation engine 432 identifies a cluster with only unknown reputations, or a large cluster with only a small number of known reputations, clustering reputation engine 432 may also interact with URL reputation engine 406 to request that URL analysis engine 412 prioritize analyzing some number of URLs within that cluster. This can help to ensure that at least some URLs in the cluster have received a reputation, and that the reputation can be propagated out to other members of the cluster, if appropriate.

Defensive registration module 436 may carry out an algorithm to determine whether a cluster of URLs represents, in whole or in part, a legitimate defensive registration of domain names.

Client API 440 provides an interface into cloud platform 400, which enables endpoints and clients to query the system to receive reputation data for a URL.

Figure 5:
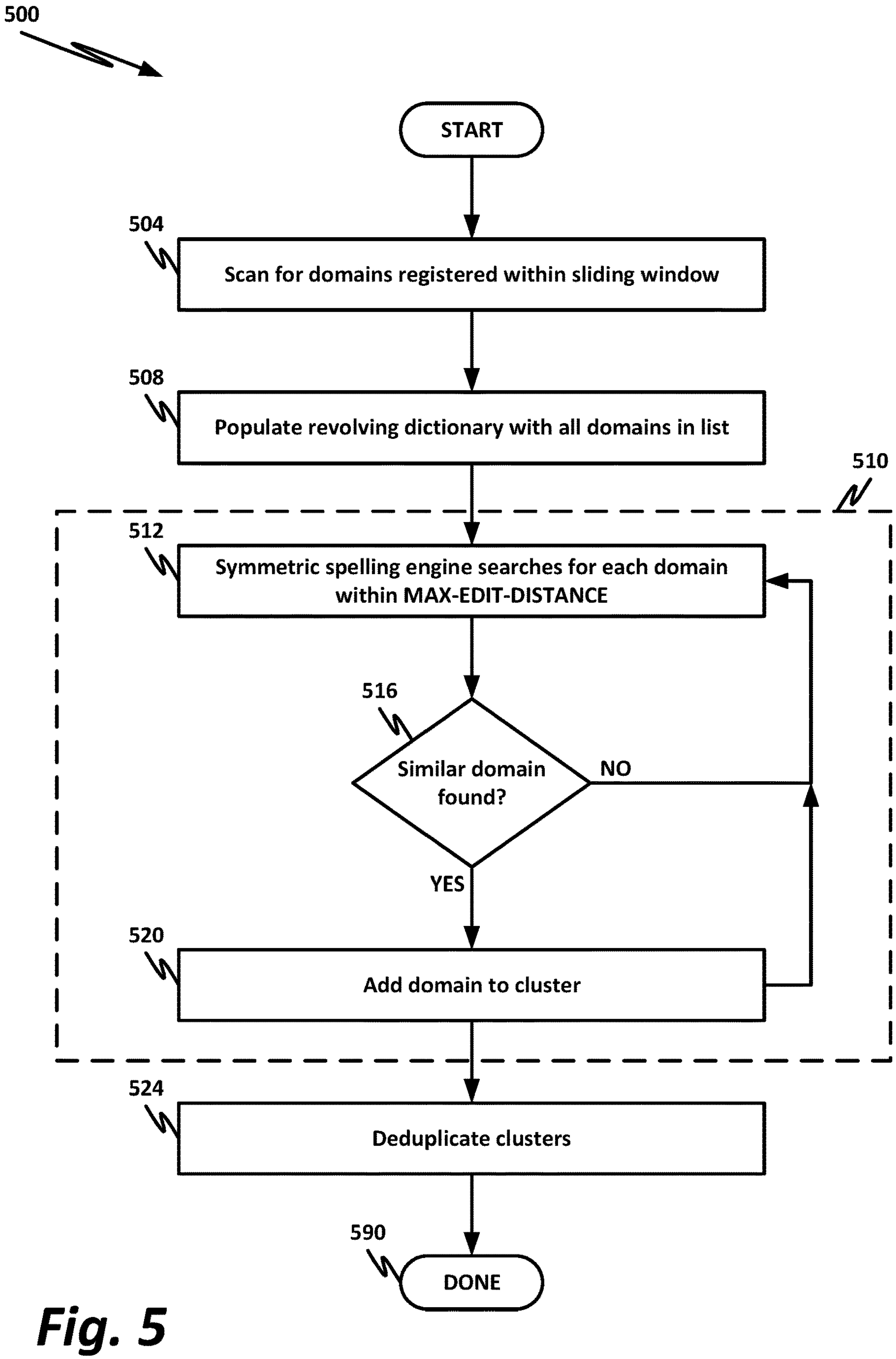
FIG. 5 is a flowchart of selected elements of a method.

FIG. 5 is a flowchart of selected elements of a method 500. Method 500 may be used to identify clusters of similar URLs, according to examples of the present specification.

Starting in block 504, the system may scan or perform a query to identify a number of domains registered within a sliding window. This can include, for example, querying a WHOIS or other database, or interfacing with a registrar to identify recently registered domain names.

In block 508, the system makes a list of recently registered domains, and then populates a revolving dictionary with all domains in the list. Optionally, the system may also strip out from that list all TLDs, so that only the more relevant portion (e.g., the more human readable portion) of the domain name is left.

Metablock 510 is a sub-method performed for each domain in the list.

In block 512, a symmetric spelling engine or other spell check engine searches for domains that are similar to the domain under consideration. This may include, for a symmetrical spelling engine for example, the use of a max edit distance to identify whether there is an appropriate close domain, and if there is, which is the best match for the domain.

In decision block 516, the system determines whether a similar domain was found for this domain. If no similar domain is found, then control returns back to block 512, and the system searches the database for the next domain.

Returning to decision block 516, if a sufficiently similar domain is found (e.g., one within the max edit distance), then in block 520, that domain is added to a cluster. In particular, if one of the two domain names is already a member of a cluster, then the domain is added to that cluster and control flows back to block 512. If neither domain name is already in a cluster, then a new cluster is formed.

After all of the domains in the new registration set have been scanned, in block 524, the system performs a deduplication of the clusters. For example, if there are symmetric matches (e.g., A matches B, and B matches A), then only one of the matches is retained. Ultimately, a cluster may include simply a list of domain names that were matched, without reference to which nearest match was used to add each domain to the cluster.

In block 590, there is now a list of clustered domain names that were recently registered. The method is now done.

Figure 6:
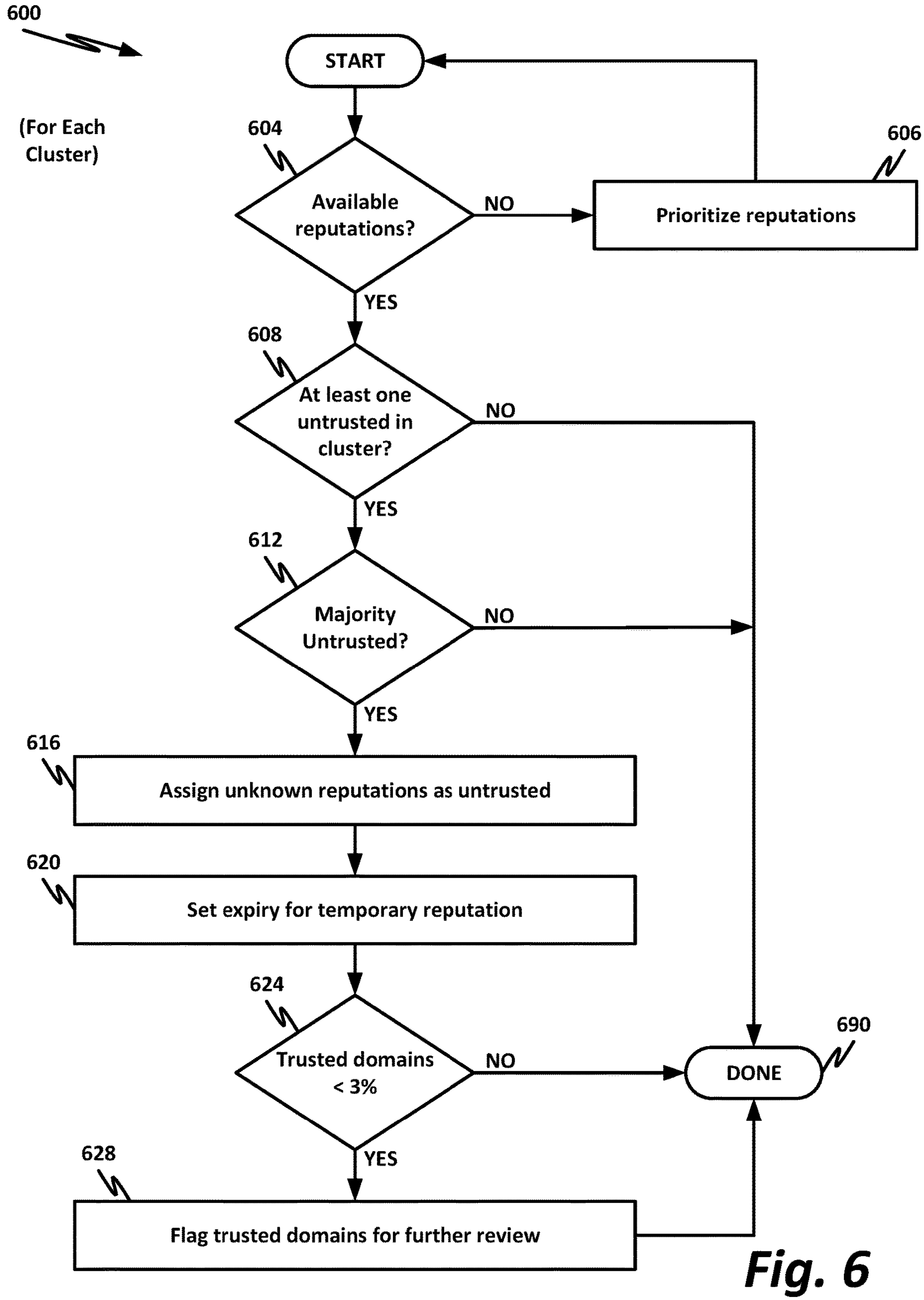
FIG. 6 is a flowchart of an additional method.

FIG. 6 is a flowchart of a method 600. Method 600 is performed for each cluster, such as for each cluster identified in method 500 of FIG. 5. This could also be performed on a database of other clusters of domain names.

Starting in block 604, the system determines whether there is at least one available reputation, or a sufficient number of reputations to operate on within the individual cluster.

If there are not sufficient reputations, then in block 606, the system prioritizes reputations for one or more domain names within the cluster. This helps to ensure that there is at least a critical mass of available reputations for each cluster. For example, given 10 clusters with 100 domain names each, it is more valuable to characterize 10 domain names in each cluster than to characterize all 100 domain names in an individual cluster.

In decision block 608, the system determines whether there is at least one untrusted domain name in the cluster. If there is not at least one untrusted domain, then in block 690, the method is done. This indicates that all the domains in the cluster are trusted, and there is no indication of a problem.

Returning to decision block 608, if there is at least one untrusted cluster, then the system may poll the number of characterized domains to determine whether the number of untrusted domains as above a threshold. For example, the threshold may be whether a majority (more than 50%) of domains is untrusted.

In block 616, if a majority of domains are untrusted, then any unknown domains in the cluster are also assigned a reputation as untrusted.

In block 620, the system sets an expiry for any temporary reputations that were assigned based on the clustering. This is to help ensure that the cluster-based reputations remain temporary. However, this operation is optional, and the cluster-based reputation could also be a permanent reputation.

In block 624, the system furthermore determines whether the number of trusted domains is less than a particular threshold. For example, the threshold could be 3%, 10%, a threshold between 3 and 10%, or some other threshold. This may mean that a super majority of domains are untrusted. In another example, a mathematical super majority (e.g., two-thirds or three-fifths) could also be used as the threshold.

If this super majority is untrusted, then in block 628, the system may flag the trusted domains for further analysis or re-analysis. This could mean that there is some indication that, although some URLs have been examined and found to be trusted, the persuasive weight of the cluster is that all of the domains in the cluster are not to be trusted, and some of them could simply be parked domains, or domains waiting for a zero-day exploit before they host their truly malicious content.

If the number of trusted domains is not less than the threshold, or if the domains have been flagged for further review, then in block 690, the method is done.

Figure 7:
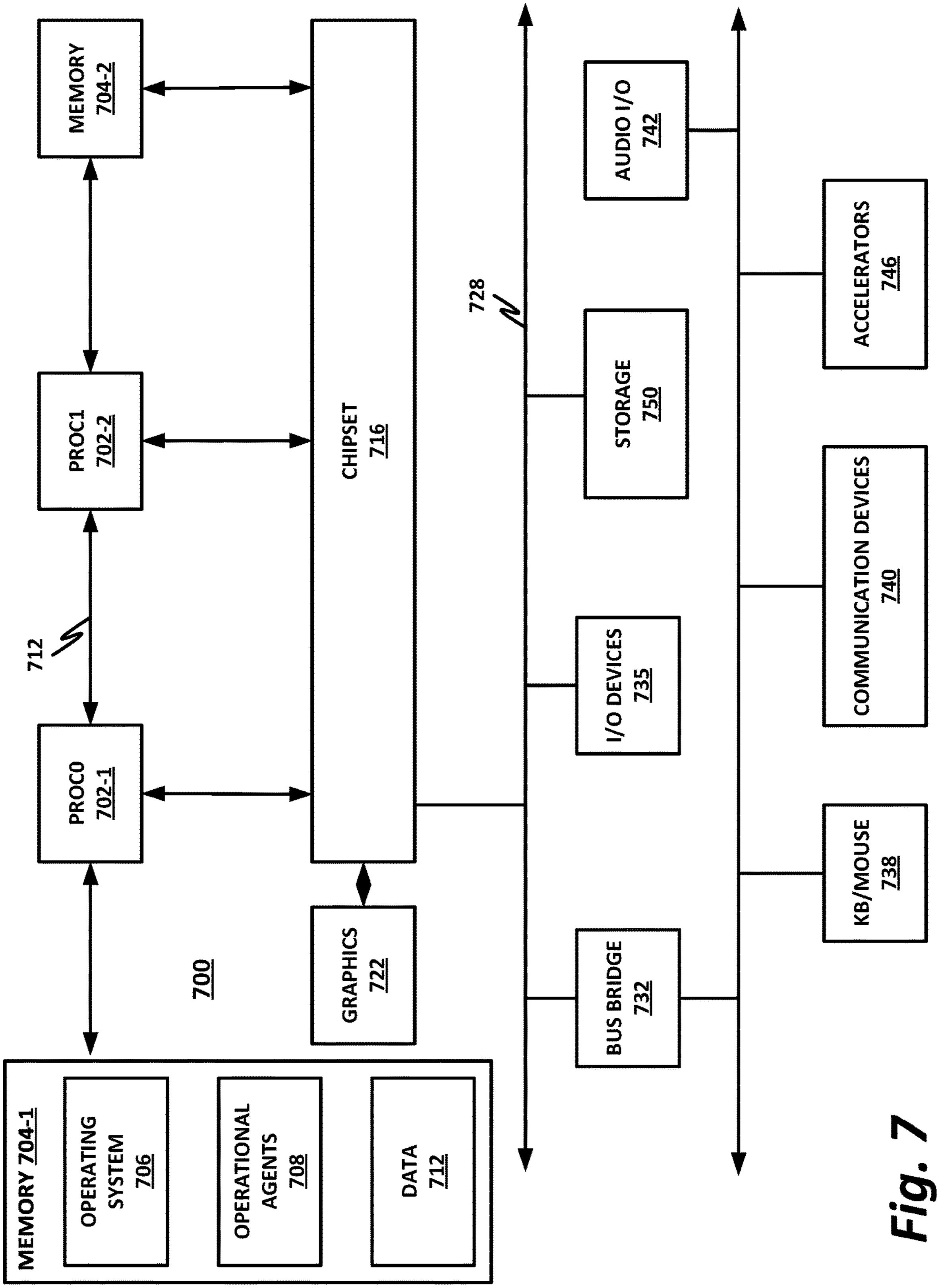
FIG. 7 is a block diagram of selected elements of a hardware platform.

FIG. 7 is a block diagram of a hardware platform 700. In at least some embodiments, hardware platform 700 may be programmed, configured, or otherwise adapted to provide reputation clusters for uniform resource locators, according to the teachings of the present specification. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, IP telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via a network interface, or retrieved from another source via any suitable interconnect. Once received (from any source), the instructions may be loaded into memory 704, and may then be executed by one or more processor 702 to provide elements such as an operating system 706, operational agents 708, or data 712.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a processor 702 or on one or more different dies or packages. Each chipset may support any suitable number of processors 702. A chipset 716 (which may be a chipset, uncore, Northbridge, Southbridge, or other suitable logic and circuitry) may also include one or more controllers to couple other components to one or more central processor units (CPUs).

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with a processor 702 via a bus. For example, some memories may be connected via a system bus, or in a data center, memory may be accessible in a remote DMA (RDMA) configuration.

Memory 704 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of processors 702 or other processing elements (e.g., logic resident on chipsets 716) to provide functionality.

In certain embodiments, memory 704 may comprise a relatively low-latency volatile main memory, while storage 750 may comprise a relatively higher-latency non-volatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human readable visual output, such as a command-line interface (CLI) or graphical desktop such as Microsoft Windows, Apple OSX desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by a network interface and the various I/O devices described herein. This may include, for example, various universal serial bus (USB), FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O 742, and/or accelerators 746. In alternative embodiments, any portions of the bus architectures could be implemented with one or more PtP links.

Operating system 706 may be, for example, Microsoft Windows, Linux, UNIX, Mac OS X, iOS, MS-DOS, or an embedded or real time operating system (including embedded or real time flavors of the foregoing). In some embodiments, a hardware platform 700 may function as a host platform for one or more guest systems that invoke application (e.g., operational agents 708).

Operational agents 708 may include one or more computing engines that may include one or more non-transitory computer-readable mediums having stored thereon executable instructions operable to instruct a processor to provide operational functions. At an appropriate time, such as upon booting hardware platform 700 or upon a command from operating system 706 or a user or security administrator, a processor 702 may retrieve a copy of the operational agent (or software portions thereof) from storage 750 and load it into memory 704. Processor 702 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 700 may be virtualized, in particular the process or(s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 8. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 8:
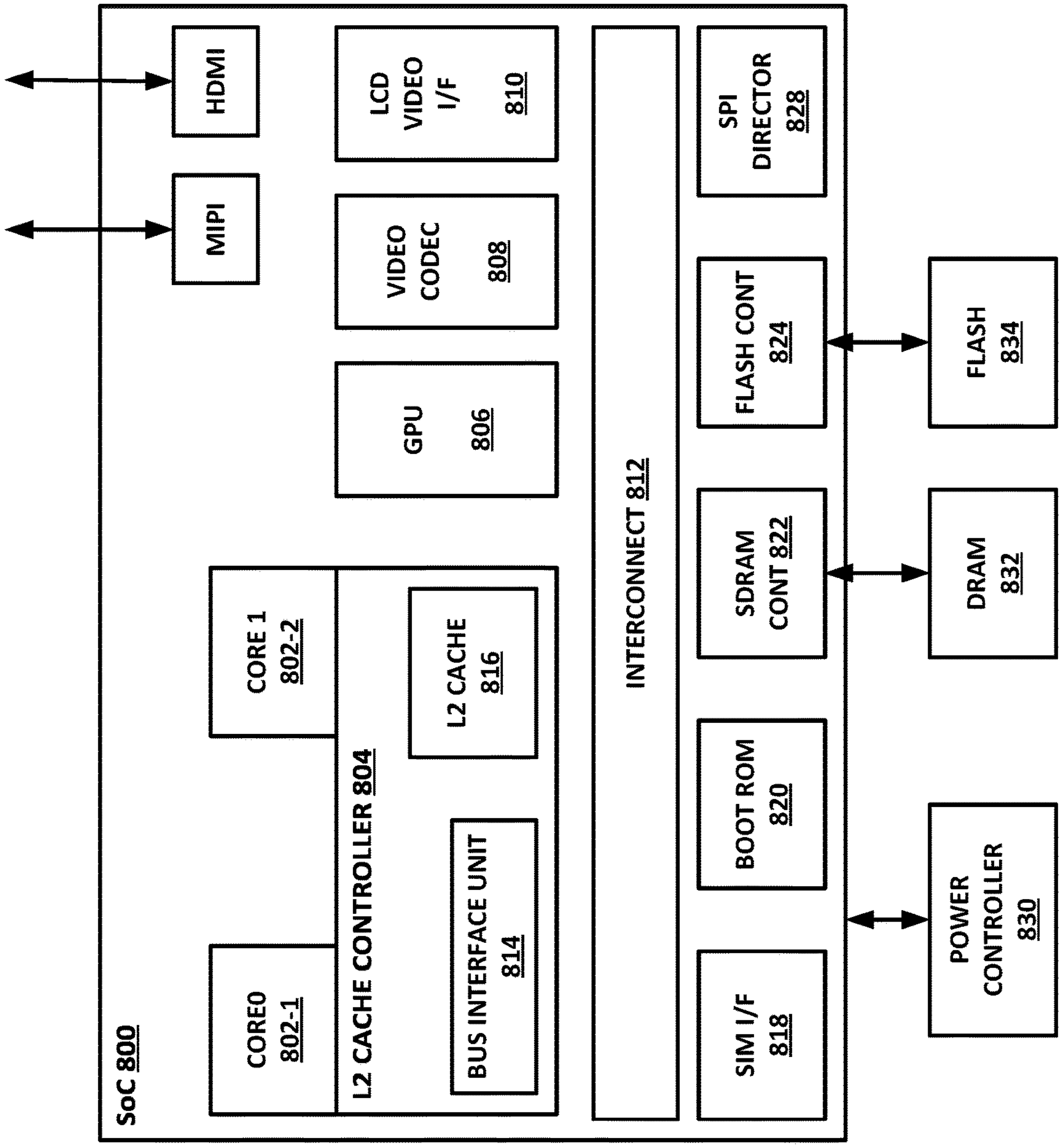
FIG. 8 is a block diagram of selected elements of a system-on-a-chip (SoC).

FIG. 8 is a block illustrating selected elements of an example SoC 800. In at least some embodiments, SoC 800 may be programmed, configured, or otherwise adapted to provide reputation clusters for uniform resource locators, according to the teachings of the present specification.

At least some of the teachings of the present specification may be embodied on an SoC 800, or may be paired with an SoC 800. SoC 800 may include, or may be paired with, an advanced reduced instruction set computer machine (ARM) component. For example, SoC 800 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 800 could also be integrated into, for example, a PC, server, video processing components, laptop computer, notebook computer, netbook, or touch-enabled device.

As with hardware platform 700 above, SoC 800 may include multiple cores 802-1 and 802-2. In this illustrative example, SoC 800 also includes an L2 cache control 804, a GPU 806, a video codec 808, a liquid crystal display (LCD) I/F 810 and an interconnect 812. L2 cache control 804 can include a bus interface unit 814, a L2 cache 816. Liquid crystal display (LCD) I/F 810 may be associated with mobile industry processor interface (MIPI)/HDMI links that couple to an LCD.

SoC 800 may also include a subscriber identity module (SIM) I/F 818, a boot ROM 820, a synchronous dynamic random access memory (SDRAM) controller 822, a flash controller 824, a serial peripheral interface (SPI) director 828, a suitable power control 830, a dynamic RAM (DRAM) 832, and flash 834. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 800 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

Figure 9:
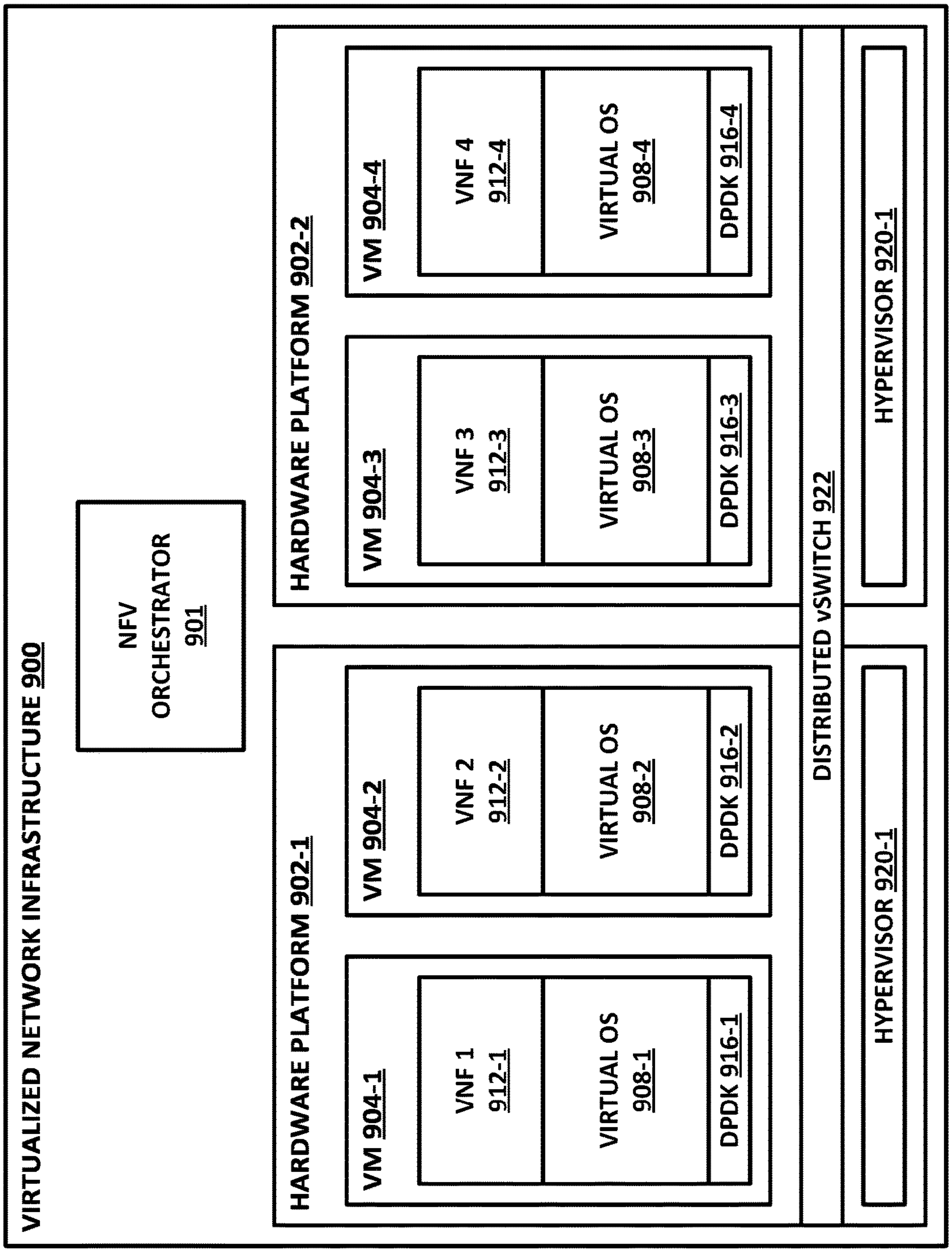
FIG. 9 is a block diagram of selected elements of a network function virtualization (NFV) infrastructure.

FIG. 9 is a block diagram of a network function virtualization (NFV) infrastructure 900. FIG. 9 illustrates a platform for providing virtualization services. Virtualization may be used in some embodiments to provide one or more features of the present disclosure.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 900. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 9, an NFV orchestrator 901 manages a number of the VNFs 912 running on an NFVI 900. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 901 a valuable system resource. Note that NFV orchestrator

901 may provide a browser-based or graphical configuration interface, and in some embodiments may be integrated with SDN orchestration functions.

Note that NFV orchestrator 901 itself may be virtualized (rather than a special-purpose hardware appliance). NFV orchestrator 901 may be integrated within an existing SDN system, wherein an operations support system (OSS) manages the SDN. This may interact with cloud resource management systems (e.g., OpenStack) to provide NFV orchestration. An NFVI 900 may include the hardware, software, and other infrastructure to enable VNFs to run. This may include a hardware platform 902 on which one or more VMs 904 may run. For example, hardware platform 902-1 in this example runs VMs 904-1 and 904-2. Hardware platform 902-2 runs VMs 904-3 and 904-4. Each hardware platform may include a hypervisor 920, virtual machine manager (VMM), or similar function, which may include and run on a native (bare metal) operating system, which may be minimal so as to consume very few resources.

Hardware platforms 902 may be or comprise a rack or several racks of blade or slot servers (including, e.g., processors, memory, and storage), one or more data centers, other hardware resources distributed across one or more geographic locations, hardware switches, or network interfaces. An NFVI 900 may also include the software architecture that enables hypervisors to run and be managed by NFV orchestrator 901.

Running on NFVI 900 are a number of VMs 904, each of which in this example is a VNF providing a virtual service appliance. Each VM 904 in this example includes an instance of the Data Plane Development Kit (DPDK), a virtual operating system 908, and an application providing the VNF 912.

Virtualized network functions could include, as nonlimiting and illustrative examples, firewalls, intrusion detection systems, load balancers, routers, session border controllers, DPI services, network address translation (NAT) modules, or call security association.

The illustration of FIG. 9 shows that a number of VNFs 904 have been provisioned and exist within NFVI 900. This FIGURE does not necessarily illustrate any relationship between the VNFs and the larger network, or the packet flows that NFVI 900 may employ.

The illustrated DPDK instances 916 provide a set of highly-optimized libraries for communicating across a virtual switch (vSwitch) 922. Like VMs 904, vSwitch 922 is provisioned and allocated by a hypervisor 920. The hypervisor uses a network interface to connect the hardware platform to the data center fabric interface. This fabric interface may be shared by all VMs 904 running on a hardware platform 902. Thus, a vSwitch may be allocated to switch traffic between VMs 904. The vSwitch may be a pure software vSwitch (e.g., a shared memory vSwitch), which may be optimized so that data are not moved between memory locations, but rather, the data may stay in one place, and pointers may be passed between VMs 904 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 922 is illustrated, wherein vSwitch 922 is shared between two or more physical hardware platforms 902.

Figure 10:
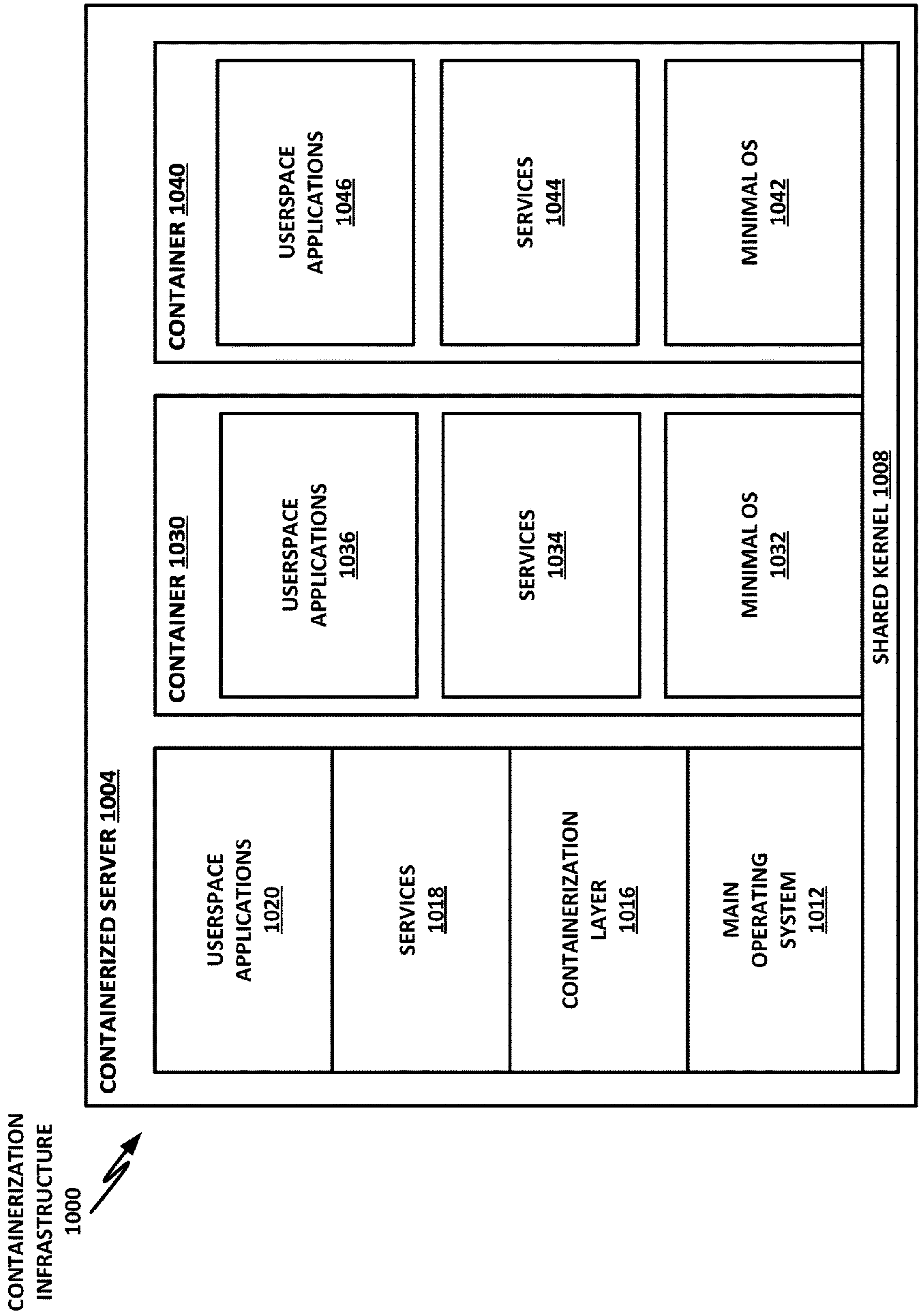
FIG. 10 is a block diagram of selected elements of a containerization infrastructure.

FIG. 10 is a block diagram of selected elements of a containerization infrastructure 1000. FIG. 10 illustrates a platform for providing virtualization services. Virtualization may be used in some embodiments to provide one or more features of the present disclosure. Like virtualization, containerization is a popular form of providing a guest infrastructure.

Containerization infrastructure 1000 runs on a hardware platform such as containerized server 1004. Containerized server 1004 may provide a number of processors, memory, one or more network interfaces, accelerators, and/or other hardware resources.

Running on containerized server 1004 is a shared kernel 1008. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1008 is main operating system 1012. Commonly, main operating system 1012 is a Unix or Linux-based operating system, although containerization infrastructure is also available for other types of systems, including Microsoft Windows systems and Macintosh systems. Running on top of main operating system 1012 is a containerization layer 1016. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1012 may also include a number of services 1018, which provide services and interprocess communication to userspace applications 1020.

Services 1018 and userspace applications 1020 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1012, they inherit the same file and resource access permissions as those provided by shared kernel 1008. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1004, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e., containerized server 1004).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1004 hosts two containers, namely container 1030 and container 1040.

Container 1030 may include a minimal operating system 1032 that runs on top of shared kernel 1008. Note that a minimal operating system is provided as an illustrative example, and is not mandatory. In fact, container 1030 may perform as full an operating system as is necessary or desirable. Minimal operating system 1032 is used here as an example simply to illustrate that in common practice, the minimal operating system necessary to support the function of the container (which in common practice, is a single or monolithic function) is provided.

On top of minimal operating system 1032, container 1030 may provide one or more services 1034. Finally, on top of services 1034, container 1030 may also provide a number of userspace applications 1036, as necessary.

Container 1040 may include a minimal operating system 1042 that runs on top of shared kernel 1008. Note that a minimal operating system is provided as an illustrative example, and is not mandatory. In fact, container 1040 may perform as full an operating system as is necessary or desirable. Minimal operating system 1042 is used here as an example simply to illustrate that in common practice, the minimal operating system necessary to support the function of the container (which in common practice, is a single or monolithic function) is provided.

On top of minimal operating system 1042, container 1040 may provide one or more services 1044. Finally, on top of services 1044, container 1040 may also provide a number of userspace applications 1046, as necessary.

Using containerization layer 1016, containerized server 1004 may run a number of discrete containers, each one providing the minimal operating system and/or services necessary to provide a particular function. For example, containerized server 1004 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and an NVM. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile RAM (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. One or more tangible, non-transitory computer-readable storage media, comprising instructions to:

- enumerate newly registered domain names within a sliding time window;
- build a spelling dictionary of the newly registered domain names;
- cluster the newly registered domain names with one another, comprising performing a symmetric spell check with the spelling dictionary to identify one or more clusters of newly-registered domain names that are similar to one another;
- for a selected cluster, identify one or more domain names with an assigned reputation; and
- based on determining that a number of domain names within the selected cluster have a bad reputation, assign temporary bad reputations to domains in the cluster that have unknown reputations, where the temporary bad reputations have an expiry.

2. The one or more tangible, non-transitory computer-readable storage media of claim 1, wherein building the dictionary comprises removing top-level domains from the domain names.

3. The one or more tangible, non-transitory computer-readable storage media of claim 1, wherein the instructions are further to provide defensive registration detection.

4. The one or more tangible, non-transitory computer-readable storage media of claim 3, wherein the defensive registration detection comprises determining that at least some domains in the selected cluster share domain metadata with a domain registered before the sliding time window.

5. The one or more tangible, non-transitory computer-readable storage media of claim 1, wherein the instructions are further to deduplicate the selected cluster.

6. The one or more tangible, non-transitory computer-readable storage media of claim 1, wherein the number of domain names is a simple majority.

7. The one or more tangible, non-transitory computer-readable storage media of claim 1, wherein the sliding time window is between approximately 24 and 48 hours.

8. The one or more tangible, non-transitory computer-readable storage media of claim 1, wherein the sliding time window is between one and seven days.

9. The one or more tangible, non-transitory computer-readable storage media of claim 1, wherein the instructions are further to determine that an insufficient number of domains in the selected cluster have a reputation, and prioritize analysis of domains in the cluster.

10. The one or more tangible, non-transitory computer-readable storage media of claim 1, wherein the instructions are further to determine that a supermajority of domains with reputations in the selected cluster have bad reputations, and mark domains in the selected cluster with good reputations for additional analysis.

11. The one or more tangible, non-transitory computer-readable storage media of claim 10, wherein the supermajority is at least ⅔.

12. The one or more tangible, non-transitory computer-readable storage media of claim 1, wherein the instructions are further to replace the temporary bad reputations with reliable reputations after subjecting the domains in the cluster to additional analysis.

13. The one or more tangible, non-transitory computer-readable storage media of claim 1, wherein the instructions are further to enforce a domain filtering policy on a computer network, based on the temporary bad reputations.

14. A computing apparatus, comprising:

- a processor circuit;
- a memory; and
- instructions encoded within the memory to instruct the processor circuit to:
  - enumerate newly registered domain names within a sliding time window;
  - build a spelling dictionary of the newly registered domain names;
  - cluster the newly registered domain names with one another, comprising performing a symmetric spell check with the spelling dictionary to identify one or more clusters of newly-registered domain names that are similar to one another;
  - for a selected cluster, identify one or more domain names with an assigned reputation; and
  - based on determining that a number of domain names within the selected cluster have a bad reputation, assign temporary bad reputations to domains in the cluster that have unknown reputations, where the temporary bad reputations have an expiry.

15. The computing apparatus of claim 14, wherein building the dictionary comprises removing top-level domains from the domain names.

16. The computing apparatus of claim 14, wherein the instructions are further to provide defensive registration detection.

17. The computing apparatus of claim 14, wherein the instructions are further to replace the temporary bad reputations with reliable reputations after subjecting the domains in the cluster to additional analysis.

18. A computer-implemented method, comprising:

enumerating domain names newly registered domain names within a sliding time window;

building a spelling dictionary of the newly registered domain names;

clustering the newly registered domain names with one another, comprising performing a symmetric spell check with the spelling dictionary to identify one or more clusters of newly-registered domain names that are similar to one another;

for a selected cluster, identifying one or more domain names with an assigned reputation; and based on determining that a number of domain names within the selected cluster have a bad reputation, assigning temporary bad reputations to domains in the cluster that have unknown reputations, wherein the temporary bad reputations have an expiry.

19. The method of claim 18, further comprising replacing the temporary bad reputations with reliable reputations after subjecting the domains in the cluster to additional analysis.

* * * * *